United States Patent
Bowman et al.

(10) Patent No.: US 9,017,815 B2
(45) Date of Patent: Apr. 28, 2015

(54) NEAR-INFRARED RADIATION CURABLE MULTILAYER COATING SYSTEMS AND METHODS FOR APPLYING SAME

(75) Inventors: Mark P. Bowman, New Kensington, PA (US); Shelley D. Verdun, Irwin, PA (US); Gordon L. Post, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 157 days.

(21) Appl. No.: 13/612,944

(22) Filed: Sep. 13, 2012

(65) Prior Publication Data

US 2014/0072442 A1 Mar. 13, 2014

(51) Int. Cl.
| | |
|---|---|
| B32B 9/04 | (2006.01) |
| B32B 19/00 | (2006.01) |
| C08F 2/48 | (2006.01) |
| C08K 3/22 | (2006.01) |
| F01D 5/28 | (2006.01) |
| B05D 3/02 | (2006.01) |
| B05D 7/00 | (2006.01) |

(52) U.S. Cl.
CPC . *C08K 3/22* (2013.01); *F01D 5/288* (2013.01); *B05D 3/0263* (2013.01); *B05D 7/52* (2013.01)

(58) Field of Classification Search
None
See application file for complete search history.

(56) References Cited

U.S. PATENT DOCUMENTS

| | | | |
|---|---|---|---|
| 2,813,908 A | 11/1957 | Young | |
| 3,457,106 A | 7/1969 | Gillery | |
| 3,969,123 A | 7/1976 | Holcombe, Jr. et al. | |
| 4,756,975 A | 7/1988 | Fujii et al. | |
| 6,165,619 A | 12/2000 | Ikenaga et al. | |
| 6,394,755 B1 | 5/2002 | Stowell et al. | |
| 6,673,762 B2 | 1/2004 | Hokkirigawa et al. | |
| 8,092,921 B2 * | 1/2012 | Bowman et al. | 428/521 |
| 8,168,711 B2 * | 5/2012 | Mamak et al. | 524/431 |
| 8,357,741 B2 * | 1/2013 | Meyer et al. | 524/406 |
| 8,414,981 B2 * | 4/2013 | Iezzi et al. | 427/508 |
| 2006/0178254 A1 | 8/2006 | Takeda et al. | |
| 2007/0187653 A1 | 8/2007 | Takeda et al. | |
| 2008/0116426 A1 | 5/2008 | Adachi | |
| 2008/0160299 A1 | 7/2008 | Mori et al. | |
| 2010/0184901 A1 | 7/2010 | Adochio et al. | |
| 2010/0310787 A1 | 12/2010 | Lehmann et al. | |
| 2011/0024667 A1 | 2/2011 | Mamak et al. | |
| 2011/0155974 A1 | 6/2011 | Chang et al. | |
| 2011/0180149 A1 | 7/2011 | Fine et al. | |
| 2011/0248225 A1 | 10/2011 | Mamak et al. | |
| 2011/0292502 A1 * | 12/2011 | Meyer et al. | 359/359 |
| 2013/0164542 A1 | 6/2013 | Geels et al. | |

FOREIGN PATENT DOCUMENTS

| | | |
|---|---|---|
| CN | 101792267 A | 8/2010 |
| CN | 101962514 A | 2/2011 |
| DE | 1105403 | 11/1955 |
| DE | 19920567 C2 | 10/2001 |
| EP | 0916411 A1 | 5/1999 |
| EP | 1251156 A1 | 10/2002 |
| EP | 1990378 A1 | 12/2008 |
| EP | 1120480 B1 | 8/2010 |
| JP | 06220654 A | 8/1994 |
| JP | 2744184 B2 | 4/1998 |
| JP | 2002317196 A1 | 10/2002 |
| JP | 2011093280 A | 5/2011 |
| JP | 2011133586 A | 7/2011 |
| RU | 2270877 C1 | 2/2006 |
| WO | 2008086436 A1 | 1/2008 |
| WO | 2006025470 A1 | 5/2009 |
| WO | 2009059900 A2 | 5/2009 |
| WO | 2009059900 A3 | 10/2009 |

OTHER PUBLICATIONS

"Near Infrared Absorption of Tungsten Oxide Nanoparticle Dispersions", Hiromitsu Takeda and Kenji Adachi, Ichikawa Research Laboratories, Sumitomo Metal Mining Col, Ltd., Journal of the American Ceramic Society (2007) 90(12), 4059-4061.

* cited by examiner

*Primary Examiner* — Sheeba Ahmed
(74) *Attorney, Agent, or Firm* — Christine W. Trebilcock

(57) ABSTRACT

Multilayer coating systems, methods of applying and related substrates are disclosed. The coating system may comprise a first coating comprising a near-IR absorber, and a second coating deposited on a least a portion of the first coating. Methods of applying a multilayer coating composition to a substrate may comprise applying a first coating comprising a near-IR absorber, applying a second coating over at least a portion of the first coating and curing the coating with near infrared radiation.

21 Claims, No Drawings

NEAR-INFRARED RADIATION CURABLE MULTILAYER COATING SYSTEMS AND METHODS FOR APPLYING SAME

GOVERNMENT CONTRACT

This invention was made with United States government support under Contract Number RES100058 awarded by the United States Department of Energy. The United States government has certain rights in this invention.

FIELD OF THE INVENTION

The present disclosure is directed to multilayer coating systems and methods for applying a multilayer coating system to a substrate and, in particular, it is related to those systems and methods curable by near-infrared radiation.

BACKGROUND INFORMATION

Coating formulations and their application over various substrates find use in numerous industries, such as, for example, those employing coated coil, coated electronic displays, coated wind blades, and coated automotive components. Coating formulations are usually comprised of thermosetting or thermoplastic materials. Thermosetting formulations typically require high temperatures to cure. Such cure can be costly, both in terms of energy and time. Thus reducing cure temperatures or bake cycles represents a significant opportunity for energy savings. Reduced energy requirements have the added benefit of reducing environmental impact through a reduction in the carbon footprint of the manufacturing process.

Near-infrared (IR) lamps direct energy to coatings by radiative transfer and often use significantly less energy than a process using a convection oven. Additionally, radiative heating is a more rapid process than convection heating. On coil coating lines with convection ovens, for example, typical residence times are 20-30 seconds whereas with near-IR lamps, the typical residence time is 1-4 seconds. Near-IR absorbing materials may reduce required cure temperatures or bake cycles when used in thermoset coating formulations. However, conventional near-IR absorbing additives also impact the visible light absorption and therefore can affect the color of the coating.

Accordingly, the need exists to effectively incorporate infrared absorbing materials into IR cured coating systems enabling reduction in energy consumption while achieving or maintaining the desired appearance and color of the coated object.

SUMMARY OF THE INVENTION

The present invention is directed to a multilayer coating system that comprises a first coating comprising a near-IR absorber, and a second coating deposited on a least a portion of the first coating.

The present invention is further directed to a method of applying a multilayer coating composition to a substrate comprising (a) applying a first coating comprising a near-IR absorber, (b) applying a second coating over at least a portion of the first coating and (c) curing the multilayer coating composition by near-IR radiation. The invention is further directed to substrates coated by such methods and/or with such multilayer coating systems.

It should be understood that this invention is not limited to the embodiments disclosed in this summary, and it is intended to cover modifications that are within the spirit and scope of the invention, as defined by the claims.

DETAILED DESCRIPTION OF THE INVENTION

The present invention is directed to a multilayer coating system that comprises a first coating comprising a near-IR absorber, and a second coating deposited on a least a portion of the first coating. As used herein "near-IR absorber" means a near-IR absorbing pigment which is an effective absorber of infrared radiation of wavelengths from 760 nanometers to 3.3 microns. Suitable near-IR absorbers include organic and inorganic materials, for example, antimony tin oxide, titanium nitride, organic quaterrylenes, carbon black, tungsten oxide, reduced tungsten oxide, tungstates, and tungsten bronzes. In embodiments, one or more near-IR absorbers can be used.

The near-IR absorber may be solid or liquid and it can be dissolved in an aqueous or organic solvent, a dry powder, or a powder dispersed in an aqueous or organic solvent. If the near-IR absorber is a solid, it may be any suitable size such as a micron sized powder or, optionally, a nanosized powder. In examples the near-IR absorber is milled from a micron sized powder to a nanosized powder. Micron sized near-IR absorber powders can be commercially sourced. In embodiments, the near-IR absorber has an average particle size ranging 15 micron to 10 nm. In other embodiments the near-IR absorber has an average particle size ranging from 50 nm to 1,000 nm. In yet other embodiments the near-IR absorber has an average particle size ranging from 50 nm to 150 nm, or can be much smaller. In particularly suitable embodiments the near-IR absorber has an average particle size of 150 nm. In other suitable embodiments the near-IR absorber has an average particle size of 110 nm.

It will be appreciated that the near-IR absorber can be included in the first coating by any means known in the art. In embodiments, the near-IR absorber can be added with or without the presence of a dispersing agent. In embodiments, other components such as flow or leveling agents may be present in the coating. Those skilled in the art will appreciate there are many components that can be used in coatings, some of which (such as flow or leveling agents) can act as dispersing agents. In embodiments, the near-IR absorber is admixed with a dispersing agent or milled in the presence of a dispersant. Nanoparticle dispersions can also be produced by crystallization, precipitation, gas phase condensation, and chemical attrition (i.e., partial dissolution). Milling the near-IR absorber in the presence of a dispersant can minimize and/or protect the nanoparticles from re-agglomerating. As a result, a relatively stable dispersion can be created. In embodiments the dispersion is stable such that the particles can remain in storage for months at ambient temperature. In embodiments, the dispersant is added to prevent agglomeration in the can, to increase its shelf life. Any suitable dispersant known in the art can be used. In embodiments a polymeric dispersing agent can be used including, for example, Solsperse 32500 (Lubrizol, Wickliffe, Ohio).

In general, the near-IR absorber can be present in the first or second coating composition in any amount sufficient to impart the desired increase in energy efficiency and/or cure or dry rate. In embodiments, a sufficient amount includes an amount of near-IR absorber needed to absorb an increased amount of IR radiation when the coating is exposed to an IR source. In embodiments, the near-IR absorber is included in the first coating in an amount of at least about 10 ppm by weight, or more particularly 100 ppm by weight, in the dried film. In embodiments, the near-IR absorber may comprise from 0.01 to 15 weight percent by weight of the first coating, with weight percent based on the total solid weight of the coating. Despite these general exemplary embodiments the amount of near-IR absorber used in the first or second coating can vary depending upon a number of factors including, for example, the coating thickness, the affect desired, and the loading and/or weight of the near-IR absorber. Additionally, there is a balance between the benefit (less energy and faster cure/dry) and the cost (absorber expense and color impact from use in topcoat/clearcoat). For example, a thicker layer of coating can require less near-IR absorber. In examples, a lower amount of near-IR transmittance in a topcoat and/or second coating can be compensated for by increasing the amount of near-IR absorber used in the first coating, and vice versa, if a topcoat and/or second coating is quite transparent to near-IR, then less near-IR absorber may be needed in the first coating to result with improved cure efficiency. In embodiments, the amount of near-IR absorber used in the first coating may be decreased if the second coating also contains near-IR absorber, as described below.

Any suitable coating can be used as the first and second coating. For example, the first coating can comprise any of a variety of thermoplastic and/or thermosetting compositions known in the art. Thermosetting or curable coating compositions typically comprise film-forming polymers or resins having functional groups that are reactive with either themselves or a crosslinking agent. Thermoplastic coating compositions typically comprise similar film-forming polymers or resins that set by drying, such as solvent evaporation, rather than chemical reaction. For both thermoplastic and/or thermosetting compositions the film-forming polymer or resin can comprise for example, acrylic polymers, polyester polymers, polyurethane polymers, polyamide polymers, polyether polymers, polysiloxane polymers, polyepoxy polymers, epoxy resins, vinyl resins, copolymers thereof, and mixtures thereof. Generally, these polymers can be any polymers of these types made by any method known to those skilled in the art. Such polymers may be solvent-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming polymers or resins may also be used in the preparation of one or both of the present coating compositions. For example, the coating compositions can comprise any of a variety of thermoplastic and/or thermosetting compositions known in the art.

Thermosetting coating compositions often, but in many cases do not, comprise a crosslinking agent that may be selected from any of the crosslinkers known in the art to react with the functionality used in the film-forming polymer or resin in the coating. Suitable examples include multifunctional isocyanates, epoxides, amines and acrylic polyols. In certain embodiments, where more than one thermosetting film-forming polymer or resin is used in a coating, the crosslinker in one of the thermosetting film-forming polymers or resins is either the same or different from the crosslinker that is used to crosslink the one or more other thermosetting film-forming polymers or resins. In certain other embodiments, a thermosetting film-forming polymer or resin having functional groups that are reactive with themselves are used; in this manner, such thermosetting coatings are self-crosslinking.

If desired, the coating compositions can comprise other optional materials well known in the art of formulating coatings, such as colorants, plasticizers, abrasion-resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 800 nm, such as less than 200 nm, or less than 70 nm. Nanoparticles can be produced by milling stock organic or inorganic pigments with grinding media having a particle size of less than 5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescenee, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The first and second coating can comprise any of a variety of suitable thermoplastic and/or thermosetting compositions known in the art as described as above. In embodiments the first and second coatings comprise thermoplastic compositions. In embodiments the second coating comprises a film-forming polymer or resin or mixtures thereof that comprises the same or different film-forming polymer or resin or mixtures thereof that are used in first coating. In embodiments, the second coating comprises a film-forming polymer or resin to which no near-IR absorber is added. In certain embodiments, the second coating comprises a film-forming polymer or resin and near-IR absorber. In certain suitable embodiments, the second coating comprises near-IR absorber, and a film-forming polymer or resin that is different from the film-forming polymer or resin in the first coating. In embodiments the near-IR absorber is present in the second coating in an amount that is less than the amount of near-IR absorber used in the first coating. In embodiments the near-IR absorber is present in the second coating in an amount of 0.01 to 50 percent by weight or 5 to 15 percent by weight of the total amount of near-IR absorber present in the first coating composition. In embodiments, a near-IR absorber is present in the second coating in any amounts up to about 25-50 percent by weight of the total amount of near-IR absorber present in the first coating composition.

In a specific embodiment, the first coating comprises a coating primer and the second coating comprises a white topcoat. In another specific embodiment, the first coating comprises an epoxy primer and the second coating comprises a polyester topcoat. For example, commercial white coil coating primer (available from PPG Industries, Inc.) (1PLW5852) can be used for the first coating, and Truform® white coil topcoat (available from PPG Industries, Inc.) can be used for the second coating. In another example, the first coating comprises a commercial wind blade primer (available from PPG Industries, Inc.) (HSP-7401) and the second coating comprises a commercial wind blade topcoat (available from PPG Industries, Inc.) (AUE-57035).

The first and second coatings of the present invention can be used alone, or in combination with one or more other coatings. For example, the first coating can be used as a primer, basecoat, or other underlayer. A "basecoat" is typically pigmented; that is, it will impart some sort of color and/or other visual effect to the substrate to which it is applied. In embodiments any of the coatings can be pigmented. An underlayer includes anything other than the topcoat or last coating layer. The second coating can be another underlayer or a topcoat. In embodiments the second coating provides protection to an underlayer such as, for example, the first coating. In embodiments the second coating can be selected for one or more reasons that those skilled in the art would appreciate such as, for example, to achieve the desired final color and/or appearance or protection. In instances where the second coating is an underlayer, a topcoat or clearcoat may also be used over all or a portion of the second coating. The second coating and/or any topcoat or clearcoat should have transparency characteristics sufficient for the transmission of near-IR light.

A clearcoat will be understood as a coating that is substantially transparent. A clearcoat can therefore have some degree of color, provided it does not make the clearcoat opaque or otherwise affect, to any significant degree, the ability to see the underlying substrate. The clearcoats used according to the present invention can be used, for example, in conjunction with a pigmented underlayer, such as a pigmented second coating. In certain embodiments, the substantially clear coating composition can comprise a colorant but not in an amount such as to render the clear coating composition opaque (not substantially transparent) after it has been cured.

The present multilayer coating system can be applied to any of a variety of substrates, for example, automotive substrates, industrial substrates, packaging substrates, wood flooring and furniture, apparel, electronics including housings and circuit boards, glass and transparencies, fiberglass composite substrates such as blades of wind turbines, sports equipment including golf balls, and the like. These substrates can be, for example, metallic or non-metallic. Metallic substrates include tin, steel, tin-plated steel, chromium passivated steel, galvanized steel, aluminum, aluminum foil, coiled steel or other coiled metal. Non-metallic substrates including polymeric, plastic, polyester, polyolefin, polyamide, polystyrene, polyacrylic, poly(ethylene naphthalate), polypropylene, polyethylene, nylon, EVOH, polylactic acid, other "green" polymeric substrates, poly(ethyleneterphthalate) ("PET"), polycarbonate, polycarbonate acrylobutadiene styrene ("PC/ABS"), polyamide, wood, veneer, wood composite, particle hoard, medium density fiberboard, cement, stone, glass, paper, cardboard, textiles, leather, both synthetic and natural, and the like. The substrate can be one that has been already treated in some manner, such as to impart visual and/or color effect.

The coatings of the present invention can be applied or deposited to all or a portion of any such suitable substrate in any manner known to those of ordinary skill in the art. For example, the coatings of the present invention can be applied by electrocoating, spraying, electrostatic spraying, dipping, rolling, brushing, roller coating, flow coating, extrusion, coil coating of flat sheet stock techniques and the like. As used herein, the phrase "deposited on" or "deposited over" or "applied" to a substrate, and like terms, means deposited or provided above or over but not necessarily adjacent to the surface of the substrate. For example, a coating can be deposited directly upon the substrate or one or more other coatings can be applied there between. A layer of coating can be typically formed when a coating that is deposited onto a substrate or one or more other coatings is substantially cured or dried.

In certain embodiments of the present invention, a film of the first coating comprising a near-IR absorber is deposited onto all or a portion of a substrate. The first coating can be applied to any film thickness appropriate for the situation. In embodiments the first coating can be applied such that the dry film thickness is about 0.1 to about 40 mils, or, more particularly, 0.2 to 10 mils. In embodiments, the first coating can be cured or dried or both by any means in the art. For examples, a thermosetting coating may be cured by UV, and a thermoplastic coating may be dried by air. In other embodiments, the first coating is not cured or dried, but rather remains wet or essentially wet when a second coating is applied.

The term "cure", "cured," "curing" or similar terms, as used in connection with a cured or curable coating or composition, e.g., a "cured composition" or "cured dry film" of some specific description, "a thermosetting composition", or "a thermoplastic composition" means that at least a portion of the polymerizable and/or crosslinkable components that form the cured composition is polymerized and/or crosslinked. Additionally, curing of a polymerizable thermosetting composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate.

In thermoplastic compositions, the term "cure" as used herein refers to a drying and/or fusing process, typically by heating the coated substrate to a temperature and for a time sufficient to substantially remove any solvents and/or fuse the polymer. In examples, the coated substrate can be air dried at ambient temperature. For example, the term "cure" should be understood to include the drying and/or fusing of thermoplastic coatings such as fluorocarbon coil coatings. In example, a thermoplastic coating or composition is cured after solvent has evaporated and/or components have fused in an amount sufficient for at least a portion of the components to form or harden resulting in a suitable coating without appreciable change of properties.

In embodiments for use with thermoplastic and/or thermosetting compositions, the coatings of the present invention may cure at ambient or may be cured by near-IR radiation emitted by one near-infrared lamp or, alternatively, a plurality of emitters arranged in an interior treatment chamber. Each emitter may be a high intensity infrared lamp, such as a quartz envelope lamp having a tungsten filament. The coatings can be cured in the near-IR radiation for a time sufficient to affect the cure or dry of the coating. For examples, the coatings may be cured for a period of time ranging from 0.1 seconds to 30 minutes, depending upon the characteristics of the coating composition including the amount of near-IR absorber, if any.

The second coating may be applied to all or a portion of the first coating using any of the methods described above. In embodiments, the second coating can be applied to any film thickness appropriate or desired for the situation. In embodiments the second coating can be applied such that the dry film thickness is about 0.1 to about 40 mils, or, more particularly, 0.2 to 10 mils. The functional thickness range of the second coating can vary depending upon the coating system. In embodiments wherein the second coating is quite transparent to near-IR, it can have a fairly large dry film thickness and still provide a pronounced impact of using a near-IR absorber in the first coating. In embodiments wherein the second coating is less transparent to near-IR (e.g., it contains a decent amount of carbon black, such as for example an amount more than 10 ppm), then the second coating may need to be relatively thin to allow enough near-IR to pass through to the first coating. The second coating is then cured by applying near-IR radiation.

In embodiments, the second coating is deposited on a first coating that has been cured and/or dried. In some embodiments, after forming a film of the first coating on the substrate, a second coating is deposited directly on the first coating, in a wet-on-wet process. In embodiments the wet-on-wet process can eliminate the bake and cool steps that are often required to allow the first coating time to cure and/or dry, thereby offering potential time and/or energy savings.

When exposed to near-IR light, the near-IR absorber can improve the energy efficiency and/or productivity of curing and/or drying the coating. The first coating, doped with the IR absorber, absorbs an increased amount of IR radiation when the coating system is exposed to an IR source. The first coating thus can get hot faster during near-IR baking than without the absorber. In turn the heat from the first coating heats up the second coating and can help to speed up the near-IR cure of the second coating. Then the second coating can be cured faster. The faster cure can result in a decrease in the amount of energy required to power the near infrared used to cure/dry the coating. This savings can be realized regardless of whether the first coating is cured and/or dried, in whole or in part or not at all (i.e., wet-on-wet), when the second coating is applied.

In addition, the increased temperature imparted to the second coating from the first coating comprising a near-IR absorber (and optionally also from the second coating if it comprises a near-IR absorber) can provide further benefit to applications in which having an elevated surface temperature may be desired. For example, an elevated surface temperature may be desired for surfaces which are exposed to cold, icy and/or snowy conditions. The increased temperature could facilitate melting of the ice or snow. In embodiments this invention could be used in combination with other ice mitigation coatings, such as those designed for enhanced ice mitigation with low ice adhesion.

In certain suitable embodiments, the present invention is useful for lighter colored coatings. Lighter colored coatings can be slow to cure or dry because the materials in lighter colors tend to block and/or reflect near-IR to varying degrees. Use of a near-IR absorber in an underlayer, such as the first coating, can help to increase the amount of near-IR absorbed by the lighter colored coating thus enabling it to capture more of the near-IR that could have otherwise been blocked and/or reflected resulting in a faster more efficient cure. Thus, in embodiments, less or no near-IR absorber can be added to the second coating or topcoat while still enabling the second coating or topcoat to be cured faster.

Additionally, conventional near-IR additives can impact the visible light absorption, and therefore can affect the color of the coating. Lighter color coatings can be especially sensitive to the color imparted by near-IR absorbers (for example, some near-IR absorbers impart a blue hue), such as when used in the topcoat. Inclusion of the near-IR absorber in an underlayer can eliminate or minimize a potential color shift or change. A color shift or change can be determined by comparing the color of a coating system containing no near-IR absorber with the coating system containing near-IR absorber. For example, the color shift can be measured using spectroscopy. The range of tolerable color change varies depending upon the application. For some applications for which color change is a concern, the color change has a delta E that is not greater than 10. In other applications, the delta E is not greater than 5 or 2, or more particularly 1.

In certain embodiments, the coating system of the present invention is particularly suitable for use on metallic substrates, such as a coiled metal strip or a blank, and can include ferrous metals and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL, GALVALUME, and GALVAN zinc-aluminum alloys coated upon steel, and combinations thereof. Useful non-ferrous metals include aluminum, zinc, magnesium and alloys thereof. Combinations or composites of ferrous and non-ferrous metals can also be used.

Before depositing coatings on the surface of the metallic substrate, it is typically desired to remove foreign matter from the metal surface by thoroughly cleaning and/or degreasing the substrate surface. The surface of the metallic substrate can be cleaned by physical or chemical means, such as mechanically abrading the surface or, as is typical, cleaning/degreasing with commercially available alkaline or acidic cleaning agents which are well known to those skilled in the art, such as sodium metasilicate and sodium hydroxide. Non-limiting examples of suitable cleaning agents include CHEMKLEEN® 163 and CHEMKLEEN® 177 phosphate cleaners, both of which are commercially available from PPG industries, Inc. of Pittsburgh, Pa.

Following the cleaning step, the surface of the metallic substrate may be rinsed with water, typically deionized water, in order to remove any residue. Optionally, the metal surface can be rinsed with an aqueous acidic solution after cleaning with the alkaline cleaners. Examples of rinse solutions include mild or strong acidic cleaners such as the dilute nitric acid solutions commercially available and conventionally used in metal pretreatment processes. The metallic substrate can be air-dried using an air knife, by flashing off the water by brief exposure of the substrate to a high temperature or by passing the substrate between squeegee rolls.

Optionally, a phosphate-based pretreatment or conversion coating can be applied to the metallic substrate. Suitable phosphate conversion coating compositions include those known in the art, such as zinc phosphate, optionally modified with nickel, iron, manganese, calcium, magnesium or cobalt. Useful phosphating compositions are described in U.S. Pat. Nos. 4,793,867 and 5,588,989; 4,941,930; 5,238,506 and 5,653,790.

In embodiments, the system may be applied to a metal coil by roll coating. For coil coating a metal substrate, a coil coating apparatus can be used to apply a coating of the present invention. The first coating can be applied to a pretreated substrate. The coating is then cured by near-IR for an amount of time that is sufficient to cure the coating. The near-IR cure exposure time for application can depend upon and be controlled by the specific lamp that is used to form a cured dry film. The film thickness can vary depending upon the intended use.

Accordingly, the present invention is also directed to a coiled metal substrate coated at least in part with the coating system described above.

The multilayer coating systems of the present disclosure can speed up near-IR radiation cure rates to capture energy and/or productivity savings while maintaining the desired appearance of the coated substrate.

For purposes of the above detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent. For example, although reference is made herein to "a" first coating composition layer, "a" topcoat, "a" dispersing agent and the like, one or more of each of these components, and of any other components, can be used.

The various embodiments and examples of the present invention as presented herein are each understood to be non-limiting with respect to the scope of the invention.

The invention will be further described by reference to the following examples. The following examples are merely illustrative of the invention and are not intended to be limiting.

EXAMPLES

Examples 1-4 demonstrate the effects of using a near infrared absorber in a multilayer coating system and methods for preparation thereof. In these examples, the panels were baked for an interval of time at a distance of 1.5 inches from a near-IR lamp custom built by Power Process Inc. (New Kensington, Pa.). Solvent resistance was checked (MEK double rubs). In each case, if the coating was marred by the solvent resistance test another panel was made up and baked under the near-IR lamp for increasing amounts of time until it could hold up to 100 double rubs of MEK. Coating temperatures were measured using an optical pyrometer and metal temperatures were measured using thermocouples.

Reduced Tungsten Oxide Dispersion

The near infrared absorber was formulated as follows: 240 grams of reduced tungsten oxide ($WO_{2.72}$ GTP Corp., Towanda Pa.) and 360 grams of Solsperse 32500 (Lubrizol, Wickliffe, Ohio) were ground in an Eiger mill at 3500 rpm for one hour with 2.0 mm beads, followed by grinding for eight hours with 0.3 mm beads. This yielded a reduced tungsten oxide dispersion with an average particle size of 110 nm.

Example 1

Control Test

Commercial white coil coating primer, available from PPG Industries, Inc. (1PLW5852), was drawn down on HDG steel panels and allowed to dry to yield, a 0.3 mil film build. The coated panel was baked under a near-IR lamp for 17 seconds. The peak metal temperature was 296° F. and the peak coating temperature was 437° F. Next, Truform® white coil topcoat (PPG Industries, Inc.) was drawn down on the primed panel. The panel was then baked under the near-IR lamp for an interval of time and then its solvent resistance was checked (MEK double rubs).

Example 2

Commercial white coil coating primer (of Example 1) was drawn down on HDG steel panels and allowed to dry to yield a 0.3 mil film build. The coated panel was baked under a near-IR lamp for 17 seconds. Next, 20 grams of Truform® white coil topcoat (PPG Industries, Inc.) were mixed with the reduced tungsten oxide dispersion (see above) to give a white topcoat with 1000 ppm of reduced tungsten oxide. The topcoat was drawn down on the primed panel. The panel was then baked under the near-IR lamp for an interval of time and then its solvent resistance was checked (MEK double rubs).

Example 3

The amount of 20 grams of a commercial white coil coating primer, available from PPG Industries, Inc. (1PLW5852), and 0.0771 grams of the reduced tungsten oxide were mixed together to yield a primer with 2500 ppm by weight of reduced tungsten oxide. The doped primer was drawn down on HDG steel panels. It was allowed to dry to yield a 0.3 mil film build. The coated panel was baked under a near-IR lamp for 17 seconds. The peak metal temperature was 335° F. and the peak coating temperature was 517° F. Next, Truform® white coil topcoat (PPG Industries, Inc.) was drawn down on the primed panel. The panel was then baked under the near-IR lamp for an interval of time and then its solvent resistance was checked (MEK double rubs).

Example 4

The commercial white coil coating primer doped with 2500 ppm reduced tungsten oxide (of Example 3) was drawn down on HDG steel panels. It was allowed to dry to yield a 0.3 mil film build. The coated panel was baked under a near-IR lamp for 17 seconds. Next, 20 grams of Truform® white coil topcoat (PPG Industries, Inc.) was mixed with the reduced tungsten oxide dispersion (see above) to give a white topcoat with 750 ppm of reduced tungsten oxide. The topcoat was drawn down on the primed panel. The panel was then baked under the near-IR lamp for an interval of time and then its solvent resistance was checked (MEK double rubs).

As set forth in the Table 1 below, the results of these examples demonstrate that addition of a near-IR absorber to the first coating or primer speeds up the second coating or topcoat cure. The same level of cure can be achieved in less time and/or with less energy when a near-IR absorber is included in the formulation and near-IR radiation is used to cure either or both layers of the coating. Thus, to avoid the color shift in the topcoat, cure time savings can be garnered by doping only the primer with an IR absorber, such as reduced tungsten oxide. The doped primer absorbs more near-IR, which increases the topcoat temperature.

TABLE 1

| Example | Primer $WO_{2.72}$ (ppm) | Topcoat $WO_{2.72}$ (ppm) | Cure Time (sec) |
|---|---|---|---|
| 1 | 0 | 0 | 31 |
| 2 | 0 | 1000 | 22 |
| 3 | 2500 | 0 | 26 |
| 4 | 2500 | 750 | 22 |

Note for table:
Cure on HDG Steel panels, 0.3 mil of 1PLW5852 white primer, white topcoat 0.9 mil.

Examples 5-7 demonstrate the effects on the color of a multilayer coating system when a near infrared absorber is used in a first coating or a second coating. Three multilayer coating samples were prepared: a control sample comprising a primer and a topcoat (no NIR absorber in either layer) (Example 5), a sample comprising 1 wt. % NIR absorber in a primer and a topcoat with no added NIR (Example 6), and a sample comprising a primer (no NIR added) and a topcoat with 1 wt. % NIR absorber (Example 7). For each of Examples 5-7, a commercial wind turbine blade polyurethane primer, available from PPG Industries, Inc. (HSP-7401), was drawn down on HDG steel panels and allowed to dry at room temperature for about two hours to yield a 2.0 mil film build. Next, commercial wind turbine blade polyurethane topcoat, available from PPG Industries, Inc. (AUE-57035), was drawn down on the primed panels and allowed to dry at ambient to yield a 2.5 mil film build. Alternatively, to accelerate the cure, the samples could have been exposed to near-IR. Such exposure would not likely result with any difference in the final coating appearance.

The coated panels of Examples 5-7 were allowed to sit for seven days after which the colors of the coated panels were measured using color instrument equipment to calculate the color values of the three samples and compare doped samples with the control. The CIE mathematical Tristimulus X, Y, Z functions were applied to spectral reflectance values to calculate L* a* b* values and the respective delta E. The results are shown in Table 2.

TABLE 2

| Ex | Primer WO 2.72 (ppm) | Topcoat WO2.72 (ppm) | L* | a* | b* | dE |
|---|---|---|---|---|---|---|
| 5 | 0 | 0 | 81.61 | −1.6 | 4.97 | NA |
| 6 | 10,000 | 0 | 81.58 | −1.66 | 5.09 | 0.14 |
| 7 | 0 | 10000 | 69.45 | −4.35 | −6.24 | 16.77 |

As demonstrated by the results reported in Table 2, the sample with the doped primer (Example 6) had the same color as the control sample (Example 5) that contained no NIR absorber. The delta E was far less than 1, which is about the threshold for the human eye to distinguish color changes. Delta E values of greater than 1 are more readily discernable. The sample with the doped topcoat (Example 7) had a color which was very different (delta E was 17) than either the control or doped primer samples. This demonstrates that doping the primer with the NIR pigment results in an imperceptible color shift.

Whereas particular embodiments of this invention have been described above for purposes of illustration, it will be evident to those skilled in the art that numerous variations of the details of the present invention may be made without departing from the broad inventive concept of the invention. It is understood, therefore, that this invention is not limited to the particular embodiments disclosed, but it is intended to cover modifications that are within the spirit and scope of the invention, as defined by the appended claims.

What is claimed is:

1. A multilayer coating system comprising:
   (a) a first coating comprising a thermosetting film-forming resin and a near-IR absorber, wherein, upon exposure to near-IR, the near-IR absorber can increase the rate of cure of the thermosetting film-forming resin; and
   (b) a second coating deposited on a least a portion of the first coating.

2. The coating system of claim 1 wherein the near-IR absorber is admixed with a dispersing agent.

3. The coating system of claim 2 wherein the dispersing agent is polymeric.

4. The coating system of claim 1 wherein the near-IR absorber comprises reduced tungsten oxide and/or composite tungsten oxide.

5. The coating system of claim 1 wherein the near-IR absorber has an average particle size of 15 micron to 10 nm.

6. The coating system of claim 1 wherein the near-IR absorber has an average particle size of 50 nm to 150 nm.

7. The coating system of claim 1 wherein the second coating substantially covers the first layer.

8. The coating system of claim 1 wherein the second coating contains a near-IR absorber.

9. The coating system of claim 1 wherein the second coating contains a tungsten oxide dispersion and/or composite tungsten oxide dispersion.

10. The coating system of claim 1 wherein the second coating comprises a thermoplastic and/or a different thermosetting resin than the first coating.

11. The coating system of claim 1 wherein the second coating comprises no added near-IR absorber.

12. The coating system of claim 1, wherein the near-IR absorber provides a color change to the coating system, wherein the color change has a delta E that is not greater than 1.

13. A substrate comprising a multilayer coating system of claim 1 applied to a portion thereof.

14. The substrate of claim 13, wherein the substrate comprises a wind blade.

15. A method of reducing the cure time and/or the amount of near-IR radiation needed to cure a multilayer coating composition on a substrate, the method comprising:
   (a) applying a first coating comprising a thermosetting film-forming resin and a near-IR absorber;
   (b) applying a second coating over at least a portion of the first coating; and
   (c) curing the coating by near-IR radiation.

16. The method of claim 15 further including the step of curing the first coating by near-IR radiation prior to applying the second coating.

17. The method of claim 15 wherein the substrate comprises a metallic substrate.

18. The method of claim 15 wherein the substrate comprises a polymeric substrate.

19. A substrate treated by the method of claim 15.

20. The method of claim 15 wherein the second coating contains a near-IR absorber.

21. The coating system of claim 1 wherein the first coating contains a colorant.

* * * * *